United States Patent [19]

Gearhart

[11] 4,315,815
[45] Feb. 16, 1982

[54] PROCESS FOR SEPARATING BITUMINOUS MATERIALS AND RECOVERING SOLVENT

[75] Inventor: Junior A. Gearhart, Oklahoma City, Okla.

[73] Assignee: Kerr-McGee Refining Corporation, Oklahoma City, Okla.

[21] Appl. No.: 237,376

[22] Filed: Feb. 23, 1981

Related U.S. Application Data

[63] Continuation-in-part of Ser. No. 164,598, Jun. 30, 1980, abandoned.

[51] Int. Cl.³ .................. B65D 85/46; C10C 3/00; C10C 3/08
[52] U.S. Cl. .................. 208/321; 208/309; 208/363; 203/40; 203/72; 203/89; 202/197; 196/128
[58] Field of Search .......... 208/45, 309, 311, 321, 208/356, 363, 48 R; 203/72, 89, 40; 196/128; 202/197

[56] References Cited

U.S. PATENT DOCUMENTS

| | | | |
|---|---|---|---|
| 2,713,023 | 7/1955 | Irvine | 203/89 |
| 2,940,920 | 6/1960 | Garwin | 208/45 |
| 3,003,931 | 10/1961 | Worthen | 203/40 |
| 3,053,751 | 9/1962 | Garwin | 208/309 |
| 3,080,300 | 3/1963 | Smith | 203/89 |
| 3,403,093 | 9/1968 | Mills | 208/45 |
| 3,830,732 | 8/1974 | Gatsis | 208/309 |
| 4,017,383 | 4/1977 | Beavon | 208/309 |
| 4,101,415 | 7/1978 | Cowley | 208/45 |
| 4,125,459 | 11/1978 | Garwin | 208/309 |
| 4,264,411 | 4/1981 | Almond | 202/197 |
| 4,270,975 | 6/1981 | Bennett | 202/197 |

*Primary Examiner*—Brian E. Hearn
*Attorney, Agent, or Firm*—William G. Addison

[57] ABSTRACT

A process and apparatus for separating a solvent from a bituminous material by pressure reduction and steam stripping without carry-over of entrained bituminous material. A fluid-like phase comprising bituminous material and solvent is reduced in pressure by passage through a pressure reduction valve to vaporize a portion of the solvent. The reduction in pressure also results in dispersing a mist of fine particle size bituminous material in the vaporized solvent. The stream of vaporized solvent, fine particle size bituminous material and fluid-like bituminous material then is introduced into a steam stripper through an inlet horn that imparts a centrifugal motion to the stream. The inlet horn contains a plurality of corrugated vanes which utilize the centrifugal motion to create turbulence in the stream within the inlet horn. The turbulence causes at least a portion of the fine particle size bituminous material to impinge on the surfaces of the inlet horn and recombine with the fluid-like material from which it was formed. The vaporized solvent and steam are withdrawn from the stripper substantially free of entrained bituminous material.

18 Claims, 4 Drawing Figures

PROCESS FOR SEPARATING BITUMINOUS MATERIALS AND RECOVERING SOLVENT

This application is a continuation-in-part of Ser. No. 164,598 filed June 30, 1980, now abandoned.

BACKGROUND OF THE INVENTION

1. Field of the Invention

This invention relates to an improved process for separating bituminous materials into various fractions employing solvents at elevated temperatures and pressures.

2. Brief Description of the Prior Art

Many methods for extracting various fractions from bituminous materials have been disclosed previously in the prior art, perhaps the most well known of these being termed "propane extraction" in which asphaltic materials are extracted or recovered from heavy hydrocarbon materials such as reduced crudes by means of a single solvent extraction step using propane as the extractant.

U.S. Pat. No. 2,940,920, assigned to the same assignee as the present invention, discloses that solvents other than propane can be used to separate heavy hydrocarbon materials into at least two fractions at a greatly improved rate of separation and in a manner which eliminates certain prior art operating difficulties encountered in the use of propane type solvents ($C_2$ to $C_4$ hydrocarbon solvents). That patent discloses effecting the separation by using high temperature-pressure techniques and by using pentane as one of a group of suitable solvents. Such practice permits a deeper cut to be made in the heavy hydrocarbon material.

U.S. Pat. No. 4,125,459, assigned to the saem assignee as the present invention, discloses a process for separating a heavy hydrocarbon material into three fractions by using a combination of propane and pentane deasphalting techniques. That process includes (i) mixing the heavy hydrocarbon material with pentane at elevated temperatures and pressures to produce a light fraction containing resins and oils, (ii) mixing the light fraction with propane at high temperatures and pressures to produce a second light fraction comprising oils and a second heavy fraction comprising resins and (iii) recycling at least a portion of the resins fraction back to the pentane deasphalting process. Alternatively, that process may be carried out by subjecting the heavy hydrocarbon material first to a propane deasphalting process to produce a heavy fraction containing asphaltenes and resins, followed by a pentane deasphalting process on the asphaltene-resin fraction previously obtained to produce a second light fraction comprising resins and a second heavy fraction comprising asphaltenes and recycling at least a portion of the resins fraction back to the propane deasphalting process.

U.S. Pat. No. 3,830,732 discloses a two solvent extraction process for producing three fractions from a hydrocarbon charge stock containing asphaltenes, resins and oils. The charge stock is admixed with a first solvent in a volumetric ratio of solvent to charge stock of less than about 4:1 to form a mixture that is introduced into a first extraction zone maintained at an elevated temperature and pressure. The mixture separates within the first extraction zone to produce a first solvent-rich liquid phase containing oils which are free of asphaltenes and resins and a first solvent-lean liquid phase containing asphaltenes and resins. The solvent-lean liquid phase then is contacted with a second solvent containing at least one more carbon atom per molecule than said first solvent and introduced into a second extraction zone. The second extraction zone is maintained at a lower temperature and pressure than the first extraction zone to separate the solvent-lean liquid phase into a second solvent-rich liquid phase containing resins and a second solvent-lean liquid phase containing asphaltenes.

U.S. Pat. No. 4,101,415 discloses a single solvent extraction process for separating a heavy hydrocarbon material into three different fractions by a process employing a two stage solvent treatment wherein different solvent to feed ratios and different temperatures are used in each stage. The charge stock is admixed with the solvent in a volumetric ratio of solvent to feed in the range of 2:1 to 10:1 and introduced into a first extraction zone maintained under temperature and pressure conditions sufficient to cause the mixture to separate into a first solvent-rich fraction containing oils and a first solvent-lean fraction containing asphaltenes and resins. The solvent-lean fraction then is contacted with an additional portion of the solvent and introduced into a second extraction zone maintained at a temperature and pressure lower than in the first extraction zone to cause asphaltic solids to form. The soluble material then is separated from the asphaltic solids.

In many of the prior art separation processes, the solvent is separated from the various products by either or both pressure reduction and steam stripping. The solvent is vaporized by such treatment, separated from the bituminous product and condensed for recycle in the separation process.

It has been observed that in some instances a portion of the bituminous material introduced into the steam stripping apparatus is carried out of the steam stripper in the form of an atomized mist of fine particles with the vaporized solvent and steam. When the solvent is condensed, the fine particles solidify and settle within the process apparatus. The settling solids ultimately plug the apparatus and cause a disruption of the bituminous separation process.

SUMMARY OF THE INVENTION

The discovery now has been made that it is possible to separate a solvent from a bituminous material by pressure reduction and steam stripping without carry-over of fine particle size bituminous material to the solvent recovery apparatus. The process comprises introducing the separated stream of solvent and bituminous material into a steam stripper having especially designed apparatus for introduction of the same therein following pressure reduction.

Initially, a bituminous feed is admixed with a solvent and introduced into a first separation zone. The first separation zone is maintained at an elevated temperature and pressure to effect a separation of the mixture into a fluid-like first light phase comprising light bituminous material and solvent and a fluid-like first heavy phase comprising heavy bituminous material and solvent. The first light phase is withdrawn from the first separation zone and introduced into a second separation zone for additional processing.

The first heavy phase is withdrawn from the first separation zone and reduced in pressure by passage through a pressure reduction valve. The reduction in pressure causes a substantial portion of the solvent in the first heavy phase to vaporize. Unfortunately, the pressure reduction also results in the formation of an undesirable fine particle size mist of a portion of the heavy bituminous material. The resultant mixture of vapor, mist and fluid-like material then is introduced into a steam stripper for separation of the solvent remaining in the fluid-like material. The steam stripper is provided with an especially designed inlet horn. The inlet horn curves about a portion of the circumference of the steam stripper. The inlet horn is provided with a plurality of vanes which have a corrugated structure. The fluid-like material introduced into the steam stripper is caused to flow into the stripper in such a manner that the walls of the horn and the vanes are substantially wetted by the fluid-like material which then flows from the horn down the walls of the stripper into a lower portion of the stripper. The method of fluid-like material introduction causes the fine particle size material to turbulently impinge on the wetted walls and vanes and to be retained thereon. The retained fine particles then flow down the walls of the stripper with the fluid-like material. The solvent remaining dissolved in the fluid-like material is vaporized by steam introduced into the lower section of the stripper. The vaporized solvent and steam then are withdrawn from the steam stripper and introduced into a solvent condenser. The solvent vapor and steam are condensed and the resultant liquid stream is withdrawn from the solvent condenser and introduced into a solvent surge vessel having a water draw. Because of the difference in density between the solvent and water, the water separates as a heavy layer and is withdrawn from the bottom of the solvent surge vessel while the solvent is recycled in the process.

DESCRIPTION OF THE PREFERRED EMBODIMENT

Figure 1:
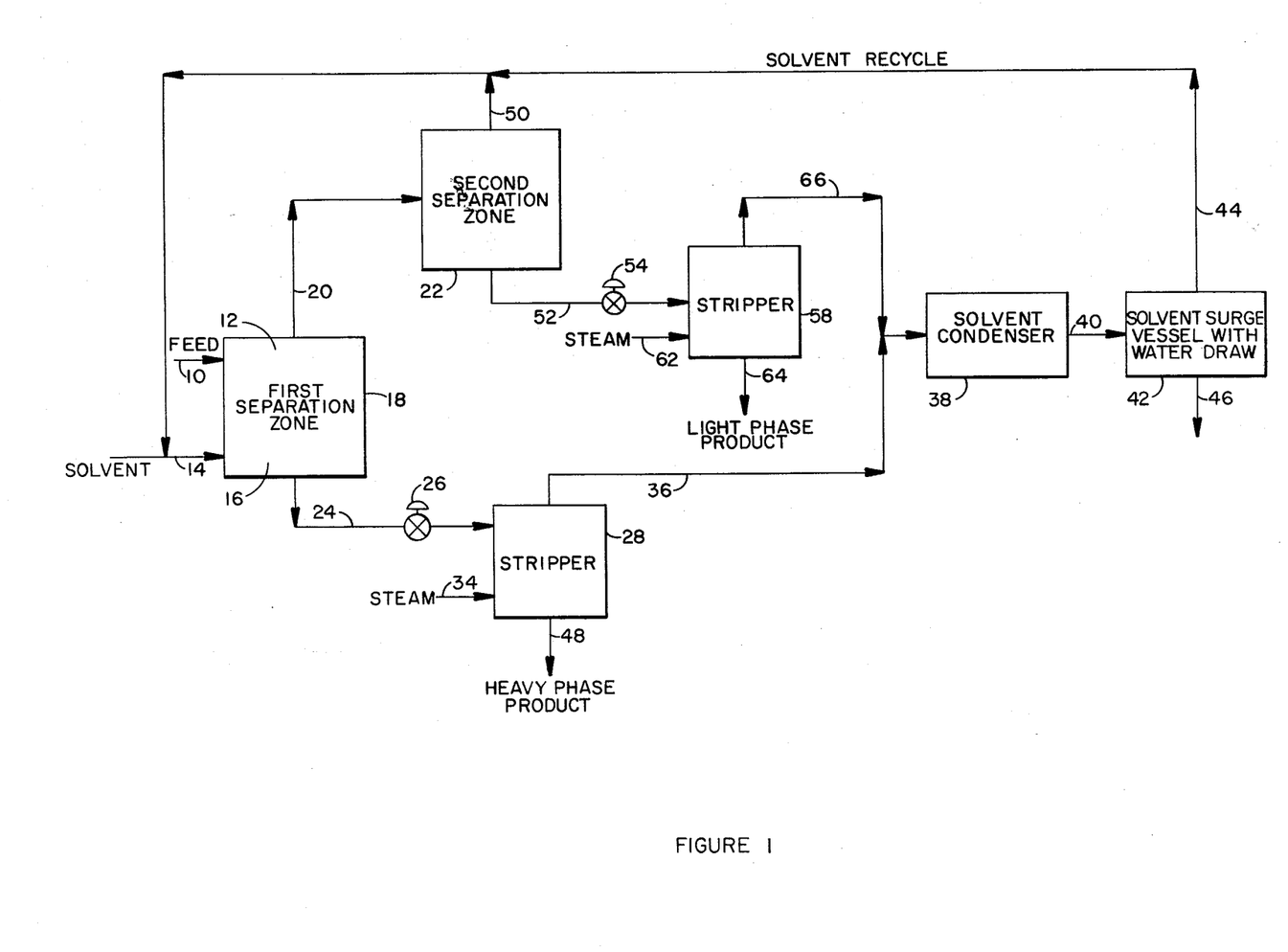
FIG. 1 is a diagrammatic illustration of the process of this invention.

Turning now to FIG. 1, a feed stock comprising a bituminous material is introduced into a first separation zone 18 through a conduit 10. Preferably, the feed is introduced into an upper portion 12 of first separation zone 18. A solvent is introduced into first separation zone 18 through a conduit 14 to contact and admix with the feed. Preferably, the solvent is introduced into a lower portion 16 of first separation zone 18. Sufficient solvent is introduced into first separation zone 18 to provide a ratio by volume of solvent to feed in the range of from about 2:1 to about 20:1 and preferably in the range of from about 8:1 to about 12:1. It is to be understood that larger quantities of solvent may be used, but such use is unnecessary.

To facilitate an understanding of the process of the present invention, and not by way of limitation, hereinafter specific reference will be made to a bituminous feed comprising an atmospheric residuum containing asphaltenes, resins and oils.

The first separation zone 18 is maintained at an elevated temperature and pressure to effect a separation of the feed mixture into a fluid-like first light phase comprising oils and solvent and a fluid-like first heavy phase comprising asphaltenes, resins and solvent.

More particularly, first separation zone 18 is maintained at a temperature level in the range of from about 150 degrees F. to above the critical temperature of the solvent. Preferably, the temperature level is maintained above the critical temperature of the solvent. The pressure level of first separation zone 18 is maintained at least equal to the vapor pressure of the solvent when zone 18 is maintained at a temperature below the critical temperature of the solvent and at least equal to the critical pressure of the solvent when maintained at a temperature equal to or above the critical temperature of the solvent. Preferably, the pressure level is maintained above the critical pressure of the solvent.

In an alternate embodiment of the invention (not shown), the feed in conduit 10 and solvent in conduit 14 are introduced into a mixing zone prior to introduction into first separation zone 18. The feed and solvent are thoroughly admixed in the mixing zone and then introduced as a mixture into first separation zone 18. The mixture then is caused to separate into the fluid-like first light phase and fluid-like first heavy phase through control of the temperature and pressure within first separation zone 18.

Referring again to FIG. 1, the first heavy phase is withdrawn from first separation zone 18 through a conduit 24 and reduced in pressure by passage through a pressure reduction valve 26 interposed in conduit 24. Preferably, the pressure level of the first heavy phase is reduced to a level of from about 0 to 50 psig. The pressure reduction vaporizes a substantial portion of the solvent in the first heavy phase, however, a small quantity of solvent remains dissolved in the fluid-like mixture of asphaltenes and resins. It has been observed that the pressure reduction or flashing process which results in vaporization of the solvent also results in the formation of an undesirable fog or atomized mist of fine particle size asphaltenes and resins. The particles are dispersed within the vaporized solvent in the form of an aerosol mist. The fine particles do not readily recombine with the fluid-like asphaltenes and resins. The mixture of vaporized solvent, mist and fluid-like asphaltenes and resins then is introduced into a steam stripper to effect the removal of any solvent remaining in association with the fluid-like asphaltenes and resins. The vaporized solvent together with the mist and steam then are introduced into a condenser.

It has been found that the fine particle size asphaltenes and resins in the vaporized solvent solidify upon condensation of the solvent and settle within the solvent condenser and other subsequent apparatus. The settling asphaltene and resin particles accumulate within the apparatus and ultimately plug the withdrawal conduits resulting in a disruption of the bituminous separation process.

A common type of feed entry for a steam stripper is one in which the feed enters radially. There are several undesirable features in radial feed entry. The severe turbulence created by the jetting effect of the entering feed expanding into the large volume of the stripper produces additional droplets of feed that become dispersed in the vaporized solvent and steam which then must be separated from the same. The radial entry of the feed also creates eddies in the vaporous stream which interferes with entrainment settling. The maximum amount of entrainment settling is limited to normal gravitational rates. For the recovery of substantially solids-free solvent from the separated crude fractions in a solvent fractionation process, gravitational settling often is not sufficient to maintain the necessary quality of the solvent stream.

The use of a tangential feed entry which delivers the mixed phase feed tangentially to a channel built around the inside of a steam stripper overcomes some of the difficulties encountered in radial feed entry. The tangential entry has two major advantages over the radial entry in reducing entrainment. First, the separation of the vapor and liquid phases of the feed is less abrupt. This minimizes formation of additional dispersed droplets in the vapor phase. Second, as the separating velocity due to the centrifugal field is directed proportional to the square of the vapor velocity and inversely proportional to the radius of curvature of the vapor stream, many of the dispersed liquid droplets will be coalesced and deposited on the inner surface of the stripper vessel wall.

Although the conventional tangential entry provides a major improvement in the vapor-liquid separation efficiency, there are disadvantages associated with its use. First, the separation efficiency is not actually in proportion to the increased gravitational force at the periphery of the tangetial entry. The main reason for the reduction in the theoretical separation efficiency is that some of the separated liquid is re-entrained by eddy currents which form below the tangential entry. Too great a downward velocity also will cause a remixing of the vapor and liquid. Second, with the conventional tangential entry the flow characteristics of the vapors as they flow through the annular channel opening and into the upper part of the stripper are disturbed by eddy currents formed after they pass through the channel. Turbulence is created by the impact of the higher velocity stream at the channel into the slower moving fluid downstream. Eddy currents formed beyond the sudden enlargement in cross-sectional flow area upon entry of the mixture into the stripper form local velocity acceleration paths which interfere with uniform vapor flow and thereby interferes with entrainment settling. The process and apparatus of the present invention overcome at least some of the disadvantages of tangential feed entry into the stream stripper.

In accordance with the process of the present invention, the mixture of vaporized solvent, fine particle size asphaltenes and resins and fluid-like asphaltenes and resins is introduced into a stream stripper 28 provided with an especially designed introduction means.

In general, the introduction means provides for introduction of a mixture comprising at least two components, at least one component of which is at least partially vaporized, into apparatus, such as for example, steam stripping apparatus. Particular benefits have been observed to accrue through use of the present introduction means when the vaporized portion of the vaporizable component has fine particles of at least a portion of the nonvaporized other component of the mixture dispersed therein upon entry of the mixture into the apparatus. The introduction means effects introduction of the mixture into the apparatus in a manner such that a centrifugal motion is imparted to the mixture. The centrifugal motion is employed to create an increase in turbulence in the mixture to cause at least a portion of the nonvaporized component of the mixture to coat or wet the inner surfaces of the apparatus and also causes at least a portion of the fine particles of the nonvaporized component dispersed in said vaporized portion of the vaporizable component to turbulently impinge upon the coated or wetted surfaces of the apparatus. When the fine particles impinge upon the wetted surfaces they tend to coalesce with or adhere to the nonvaporized component of the mixture that is coated thereon. This coalescence or adherence removes the fine particles from association with the vaporized portion of the vaporizable component.

Figure 2:
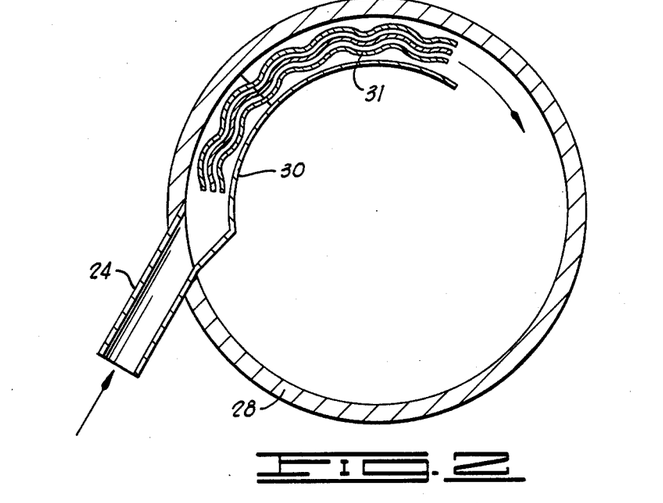
FIGS. 2 and 3 illustrate two configurations of portions of the bituminous material steam stripper inlet horn.

Referring now to FIG. 2 and to one particular embodiment of the present invention, the mixture comprising vaporized solvent, fine particle size asphaltenes and resins and fluid-like asphaltenes and resins is introduced into steam stripper 28 through an inlet horn 30 extending about at least a portion of the circumference of the stripper. The inlet horn 30 comprises at least one channel having at least three solid side walls. The fourth side wall can be open, solid over a portion of the length of the channel or solid the entire length of the channel. Preferably one solid side wall of the channel comprises the inner wall of the steam stripper 28. A plurality of vanes 31 are positioned within the inlet horn 30. The vanes 31 have a corrugated structure and extend at least a portion of the length of inlet horn 30. The vanes can be of varying length and comprised of several segments. Preferably, the inlet horn 30 extends about the circumference of steam stripper 28 for from about one fourth to three fourths of the circumference of the stripper.

Inlet horn 30 is positioned within steam stripper 28 in a manner such that a centrifugal motion is imparted to the mixture on passage therethrough. The centrifugal motion increases the force acting upon the mixture. The corrugated surfaces of the vanes 31 utilize the force imparted by the centrifugal motion to create substantial turbulence within the mixture as it passes through inlet horn 30. This turbulence causes the coalescence or recombination of a substantial portion of the fine particle size asphaltenes and resins with the fluid-like asphaltenes and resins. Preferably, inlet horn 30 is provided with a downward inclination to provide a downward force to the mixture in addition to the gravitational force which induces the fluid-like portion of the mixture to flow to the lowest portion of steam stripper 28. The mixture passes through the inlet horn from conduit 24 and is caused to flow outwardly from the central axis of steam stripper 28 and preferably downwardly to thoroughly wet the interior wall of steam stripper 28 with the fluid-like asphaltenes and resins contained in the mixture.

While the specific mechanism presently is unknown, the recombination of the fine particle size asphaltenes and resins is believed to be effected by the turbulence created by utilization of the motive force imparted to the fine particle size material as a result of the centrifugal motion. The turbulence causes the fine particles to impinge upon or strike the wetted surfaces of inlet horn 30 and then coalesce with or adhere to the fluid-like asphaltenes and resins that are present on the surfaces. The recombination also could result from a combination of the previously described factors together with the higher shear rate and the increased frictional effects upon the fluid-like material as it is caused to move outwardly from the central axis of the stripper and contact the curved interior surfaces of the inlet horn and stripper.

Surprisingly, the increased turbulence within the mixture in inlet horn 30 has not been found to aggrevate the entrainment problem through eddy currents created upon entry of the mixture into the steam stripper. The presence of the vanes 31 in inlet horn 30 significantly increases the quantity of fine particles removed from the vaporized solvent in comparison to a conventional tangential entry comprising a three sided channel. The overall effectiveness of the introduction means overcomes any slight enhancement in entrainment problems created by the entry of the generally more turbulently flowing mixture into the steam stripper.

Figure 3:
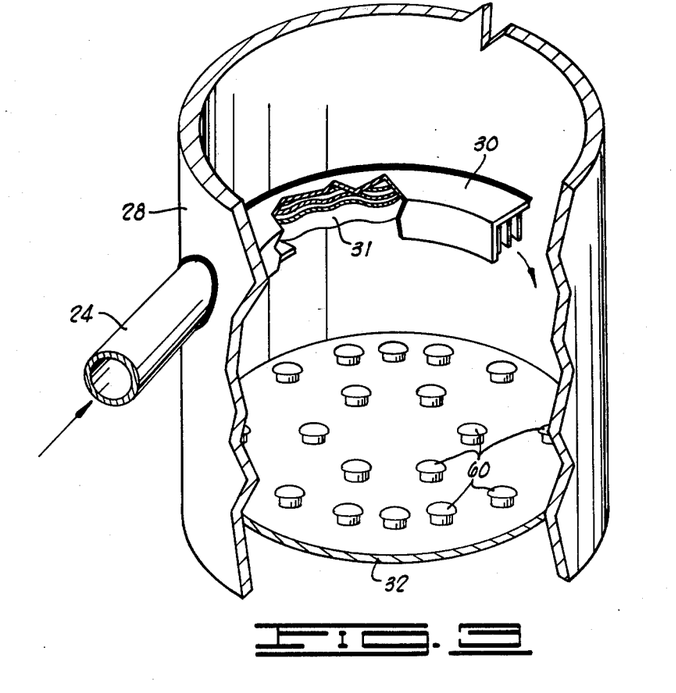

Referring now to FIG. 3, another preferred embodiment of the invention is illustrated. In this embodiment, inlet horn 30 is positioned such that the mixture is caused to enter steam stripper 28 from conduit 24 tangentially to the curved interior wall of steam stripper 28. The fluid-like asphaltenes and resins wet the interior surfaces of the inlet horn and then flow down the interior wall of the steam stripper to collect in a lower portion of steam stripper 28. Steam is introduced into the lower portion of steam stripper 28 through a conduit 34 (see FIG. 1). The steam causes any remaining solvent associated with the fluid-like asphaltenes and resins to vaporize. The vaporized solvent and steam rise through the central portion of steam stripper 28 countercurrently to the fluid-like asphaltenes and resins which are flowing down the interior wall of the stripper. This permits the fluid-like material to be preheated by the rising vapors while partially cooling the vaporized solvent and steam.

The vaporized solvent and steam are withdrawn from steam stripper 28 through a conduit 36 for introduction into a solvent condenser 38. The fluid-like asphaltenes and resins are withdrawn from the bottom of steam stripper 28 through a conduit 48 for recovery as a heavy phase product.

The lower portion of steam stripper 28 can be provided with several contacting trays 32 provided with, for example, bubble caps 60 or any other type of trays (see FIG. 3). As the fluid-like asphaltenes and resins flow down the interior wall of stripper 28, it passes over the surface of trays 32 to ultimately collect in the bottom of steam stripper 28. The steam is introduced into stripper 28 beneath the lowermost tray to rise upwardly therethrough and contact the fluid-like asphaltenes and resins to cause at least a portion of any remaining solvent to be vaporized. The vaporized solvent and steam rise through the central interior of steam stripper 28.

Operationally, the flow rate of the first heavy phase to steam stripper 28 is controlled by a level controller (not shown) in first separation zone 18. The level controller is connected with suitable sensors within first separation zone 18 which are capable of measuring the quantity of first heavy phase within first separation zone 18. The information provided by the sensors is analysed by the level controller which then activates an automatic valve (not shown) interposed in conduit 24 to increase or decrease the flow rate of the first heavy phase from first separation zone 18 by opening or closing the valve, respectively.

The fluid-like asphaltenes and resins level within the bottom of steam stripper 28 is controlled by a level controller (not shown) which is capable of activating an automatic valve (not shown) interposed in conduit 48. The level controller is connected with suitable sensors within the lower portion of steam stripper 28 which are capable of measuring the quantity of asphaltenes and resins within steam stripper 28. The information provided by the sensors is analyzed by the level controller which then activates the valve to control the rate of asphaltene and resin withdrawal through conduit 48. If the level of asphaltenes and resins is determined to be increasing within the lower portion of steam stripper 28, the level controller causes the valve to open to permit withdrawal. If an insufficient quantity of asphaltenes and resins is present within steam stripper 28 to prevent the passage of solvent through conduit 48, the valve is caused to close, at least partially, to restrict the flow of asphaltenes and resins until a desired quantity is accumulated within steam stripper 28. Level control apparatus capable of effecting the control functions previous described are well known to individuals skilled in the art and suitable apparatus commercially is available from, for example, Fisher Controls Company, Marshalltown, Iowa.

Turning again to FIG. 1, the vaporized solvent and steam are condensed within solvent condenser 38 into a liquid mixture substantially free of any fine particle size asphaltenes since practice of this invention eliminates or substantially minimizes any carry-over of the same from the steam stripper 32. The liquid mixture is withdrawn from solvent condenser 38 through a conduit 40 and introduced into a solvent surge vessel 42 which includes a water draw.

In surge vessel 42 the solvent separates from the water as a result of the difference in fluid densities and the solvent is withdrawn through a conduit 44 for recycle in the process. The separated water which has a density greater than that of the solvent is withdrawn from the water draw in the bottom of surge vessel 42 through a conduit 46 and can be sewered or disposed of in any other suitable manner.

The separated first light phase comprising oils and solvent is withdrawn from the first separation zone 18 through a conduit 20 and introduced into a second separation zone 22. In one particular embodiment, the second separation zone 22 is maintained at a temperature level higher than the temperature level in the first separation zone 18 and at an elevated pressure to effect a separation of the first light phase into a second light phase comprising solvent and a fluid-like second heavy phase comprising oils and some solvent. The second light phase comprising solvent is withdrawn from the second separation zone 22 through a conduit 50 for recycle in the process. The second heavy phase is withdrawn through a conduit 52 for recovery or additional treatment.

More particularly, second separation zone 22 is maintained at a temperature level in the range of from about 20 degrees F. above the temperature level in first separation zone 18 to above the critical temperature of the solvent. The pressure level of second separation zone 22 is maintained at least equal to the vapor pressure of the solvent when zone 22 is maintained at a temperature below the critical temperature of the solvent and at least equal to the critical pressure of the solvent when maintained at a temperature equal to or above the critical temperature of the solvent. The pressure level in second separation zone 22 can be substantially the same pressure level as is maintained in first separation zone 18.

In another embodiment also illustrated by FIG. 1, the feed and solvent are introduced into first separation zone 18 as hereinbefore described. In this instance, first separation zone 18 is maintained at a temperature level and pressure level determined to effect a separation of the feed mixture into a first light phase comprising oils, resins and solvent and a first heavy phase comprising asphaltenes and some solvent.

The first heavy phase is withdrawn from first separation zone 18 through conduit 24 and treated as previously described to recombine any fine particle size asphaltenes that are dispersed in the vaporized solvent upon pressure reduction.

The first light phase is withdrawn from first separation zone 18 through conduit 20 and introduced into second separation zone 22. The second separation zone 22 is maintained at a temperature level and pressure level determined to effect a separation of the first light phase into a second light phase comprising solvent and a second heavy phase comprising oils, resins and some solvent. Preferably, second separation zone 22 is maintained at a temperature level above the critical pressure of the solvent.

The second light phase comprising solvent is withdrawn from second separation zone 22 through conduit 50 for recycle. The second heavy phase is withdrawn from second separation zone 22 through conduit 52 as previously described. In this instance, a pressure reduction valve 54 is interposed in conduit 52 to reduce the pressure of the second heavy phase. Preferably, the pressure level of the second heavy phase is reduced to a level of from about 0 to 50 psig. The pressure reduction vaporizes a substantial portion of the solvent in the second heavy phase, however, a small quantity of solvent remains. Unfortunately, it has been found that the pressure reduction or flashing also results in the formation of an undesirable fog or atomized mist of fine particle size resins and oils. The particles are dispersed in the vaporized solvent and do not readily recombine with the fluid-like resins and oils.

It has been observed that the fine particle size resins and oils in the vaporized solvent solidify upon condensation of the solvent for recycle in the process. The solidified particles settle within the solvent condenser and other subsequent apparatus. The settling particles accumulate within the apparatus and ultimately plug the withdrawal conduits resulting in disruption of the bituminous separation process.

In accordance with the process of the present invention, the mixture of vaporized solvent, fine particle size resins and oils and fluid-like resins and oils in conduit 52 is introduced into a steam stripper 58 through an inlet horn 56 which has the same configuration as inlet horn 30 within stripper 28 described hereinbefore, Steam is introduced into the lower section of stripper 58 through a conduit 62. The mixture is separated and solvent is stripped from the fluid-like resins and oils in the same manner as from the fluid-like asphaltenes and resins in stripper 28. The resins and oils settle within the apparatus and collect in the bottom of steam stripper 58. The resins and oils are withdrawn from the bottom portion of stripper 58 through a conduit 64 for recovery.

The vaporized solvent and steam are withdrawn from stripper 58 through a conduit 66 for introduction into a solvent condenser and eventual recycle in the process. Advantageously, conduit 66 can connect to conduit 36 and the vaporized solvent and steam from stripper 58 can be combined with the vaporized solvent and steam from stripper 28 for introduction into solvent condenser 38. The solvent condenser 38 is operated as previously described to condensed the solvent after which it then is separated from the condensed steam in solvent surge vessel 42 for recycle in the process.

Figure 4:
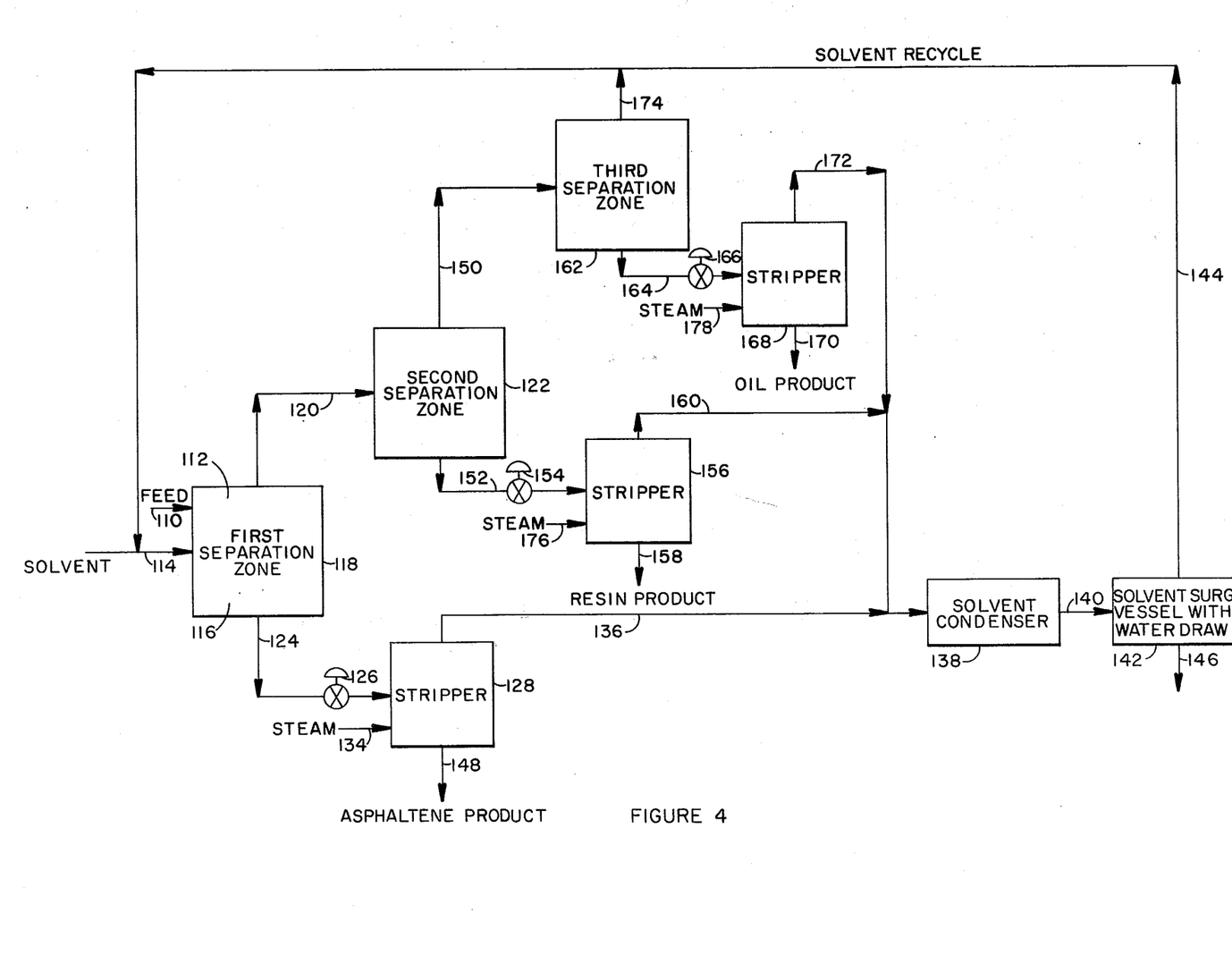
FIG. 4 is a diagrammatic illustration of another embodiment of the process of this invention.

In yet another alternate embodiment of the invention, the atmospheric residuum feed is caused to separate into three separate products comprising asphaltenes, resins and oils, respectively, as shown in FIG. 4. In this embodiment the atmospheric residuum feed is introduced into an upper portion 112 of a first separation zone 118 through a conduit 110. The feed is contacted by a solvent introduced into a lower portion 116 of first separation zone 118 through a conduit 114. The first separation zone 118 is maintained at an elevated temperature and pressure to effect a separation of the feed-solvent mixture into a first light phase comprising resins, oils and solvent and a first heavy phase comprising asphaltenes and some solvent.

The particular conditions of temperature and pressure are selected to provide a solvent density within first separation zond 118 such that a fluid-like heavy phase is caused to separate from the remaining solvent-rich light phase. More particularly, first separation zone 118 is maintained at a temperature level in the range of from about 150 degrees F. to above the critical temperature of the solvent. The pressure level of first separation zone 118 is maintained at least equal to the vapor pressure of the solvent when zone 118 is maintained at a temperature below the critical temperature of the solvent and at least equal to the critical pressure of the solvent when maintained at a temperature equal to or above the critical temperature of the solvent.

The first heavy phase is withdrawn from first separation zone 118 through a conduit 124 and reduced in pressure by passage through a pressure reduction valve 126 interposed in conduit 124. Preferably, the pressure level of the first heavy phase is reduced to a level of from about 0 to 50 psig. The pressure reduction vaporizes a substantial portion of the solvent in the first heavy phase, however, a small quantity of solvent remains dissolved in the fluid-like asphaltenes. Unfortunately, the pressure reduction also results in the formation of a fog or atomized mist of fine particle size asphaltenes which are dispersed in the vaporized solvent. The mixture of vaporized solvent, fine particle size asphaltenes and fluid-like asphaltenes then is introduced into a steam stripper 128 through an inlet horn 130 which has the same configuration as inlet horn 30 within stripper 28 (see FIGS. 1–3) described hereinbefore. Steam is introduced into steam stripper 128 through a conduit 134 to vaporize the remaining solvent associated with the asphaltenes. The fluid-like asphaltenes settle and collect in a lower portion of steam stripper 128. The asphaltenes are withdrawn from steam stripper 128 through a conduit 148 for recovery as an asphaltene product.

The mixture of vaporized solvent and steam is withdrawn from steam stripper 128 through a conduit 136 and introduced into a solvent condenser 138. The vaporized solvent and steam are condensed into a liquid mixture substantially free of any fine particle size asphaltenes. The liquid mixture then is withdrawn from solvent condenser 138 through a conduit 140 and introduced into a solvent surge vessel 142 provided with a water draw 146. The solvent then is recycled in the process through a conduit 144.

The first light phase formed in first separation zone 118 is withdrawn therefrom through a conduit 120 and introduced into a second separation zone 122. In second separation zone 122, the first light phase is caused to separate into a second light phase comprising oils and solvent and a second heavy phase comprising resins and some solvent through control of the temperature and pressure within zone 122. More particularly, second separation zone 122 is maintained at a temperature level greater than the temperature level in first separation zone 118. The pressure level of second separation zone 122 is maintained at least equal to the vapor pressure of the solvent when zone 122 is maintained at a temperature below the critical temperature of the solvent and at least equal to the critical pressure of the solvent when maintained at a temperature equal to or above the critical temperature of the solvent.

The second heavy phase is withdrawn from second separation zone 122 through a conduit 152 and reduced in pressure by passage through a pressure reduction valve 154 interposed in conduit 166. The pressure reduction of the second heavy phase causes at least a portion of the solvent present in the third heavy phase to vaporize.

In the event that the pressure reduction of the second heavy phase results in the formation of fine particle size resins in the vaporized solvent, the mixture of vaporized solvent, fine particle size resins and fluid-like resins is introduced into a steam stripper 156 through an inlet horn having the configuration of inlet horn 30 within steam stripper 28 (see FIGS. 1–3) described hereinbefore, for particle removal and solvent recovery.

Steam is introduced into steam stripper 156 through a conduit 176 to vaporize any remaining solvent associated with the resins. The resins collect in a lower portion of steam stripper 170. The resins then are withdrawn through a conduit 158 for recovery as a resin product.

In the event that the mixture contains no fine particle size resins, the mixture in conduit 152 can be introduced into the steam stripper in any conventional manner to separate the remaining solvent from the resin product.

The vaporized solvent and steam are withdrawn from steam stripper 156 through a conduit 160 and introduced into solvent condenser 138 for condensation and subsequent recovery. It is to be understood that the vaporized solvent and steam could be introduced into a separate solvent condenser, if desired.

The second light phase formed in second separation zone 122 is withdrawn therefrom through a conduit 150 and introduced into a third separation zone 162. In third separation zone 162, the second light phase is caused to separate into a third light phase comprising solvent and a third heavy phase comprising oils and some solvent through control of the temperature and pressure within zone 162. More particularly, in one embodiment, third separation zone 162 is maintained at a temperature level greater than the temperature level in second separation zone 122. The pressure level of third separation zone 162 is maintained at least equal to the vapor pressure of the solvent when zone 162 is maintained at a temperature below the critical temperature of the solvent and at least equal to the critical pressure of the solvent when maintained at a temperature equal to or above the critical temperature of the solvent.

The third light phase comprising solvent is withdrawn from third separation zone 162 through a conduit 174 for recycle in the process.

The third heavy phase is withdrawn from third separation zone 162 through a conduit 164 and reduced in pressure by passage through a valve 166 interposed in conduit 164. The pressure reduction of the third heavy phase causes at least a portion of the solvent present therein to vaporize.

In the event that the pressure reduction of the third heavy phase results in the formation of fine particle size oils in the vaporized solvent, the mixture of vaporized solvent, fine particle size oils and fluid-like oils is introduced into a steam stripper 168 through an inlet horn having the configuration of inlet horn 30 within steam stripper 28 (see FIGS. 1–3) described hereinbefore, for particle removal and solvent recovery.

Steam is introduced into steam stripper 168 through a conduit 178 to vaporize any remaining solvent associated with the oils. The oils collect in a lower portion of steam stripper 186 and are withdrawn therefrom through a conduit 170 for recovery as an oil product.

The vaporized solvent and steam are withdrawn from steam stripper 168 through a conduit 172 and introduced into solvent condenser 138 for condensation and recovery. The vaporized solvent and steam could be introduced into a separate solvent condenser, if desired.

In the event that the mixture of vaporized solvent and oils contains no fine particle size oils, the mixture can be introduced into the steam stripper in any conventional manner to separate the remaining solvent from the oil product.

Thus, any fine particle size asphaltenes, resins or oils contained in the vaporized solvent separated from the asphaltene, resin and oil products can be removed from the vaporized solvent prior to condensation of the solvent to thereby avoid carry-over of the particles into subsequent solvent recovery apparatus.

To illustrate the present invention and not by way of limitation, the following Examples are provided.

EXAMPLE I

Three tests are performed to determine the effect of the present invention upon a bituminous separation process.

In the first test, a feed comprising a low pressure crude oil fractionation tower bottoms product, otherwise referred to as atmospheric residuum, is contacted and admixed with a solvent comprising pentane in an amount sufficient to provide a solvent to feed ratio, by volume of 12:1. The feed mixture continuously is introduced into a first separation zone maintained at a temperature level of about 430 degrees F. and a pressure of about 650 psig. The feed mixture separates into a first light phase comprising oils and solvent and a first heavy phase comprising asphaltenes, resins and solvent. The first heavy phase continuously is withdrawn from the first separation zone and passed through a pressure reduction valve. The first heavy phase then is introduced into a steam stripper of uniform diameter in a conventional manner at about the midpoint and above a series of trays at a pressure of about 15 psig. The heavy phase enters the stripper radially. Steam is introduced into the lower portion of the steam stripper below the trays at a pressure of 200 psig. The steam strips any remaining solvent from the asphaltenes and resins and the vaporized solvent and steam are withdrawn and introduced into a solvent condenser. The solvent and steam are condensed and then are introduced into a solvent surge vessel with a water draw. After 8 hours of continuous operation, the solvent surge vessel is inspected and is found to contain a deposit of fine particle size asphaltenes and resins which has collected therein and partially blocked the water drain conduit.

A second test then is run in which a tangential heavy phase entry is installed to deliver the mixture of vaporized solvent, mist and fluid-like asphaltenes and resins tangentially to a channel built around the complete circumference of the steam stripper. The solvent surge vessel is cleaned and the process is operated as in the first test. After 24 hours of continuous operation the interior of the solvent surge vessel is inspected. The solvent surge vessel is found to contain a small deposit of asphaltenes and resins.

A third test then is run, in accordance with the process of this invention, by installing a steam stripper 28 provided with an inlet horn 30 (as shown in FIGS. 2 and 3) and the solvent surge vessel is cleaned. The conditions are all maintained as in the first test. After 48 hours of continuous process operation the interior of the solvent surge vessel is inspected. The solvent surge vessel is found to contain no new deposit of asphaltenes and resins.

EXAMPLE II

Three tests are performed to determine the effect of the present invention upon a bituminous separation process.

In the first test, a feed comprising an atmospheric residuum is contacted and admixed with a solvent comprising pentane in an amount sufficient to provide a solvent to feed ratio, by volume of 12:1. The feed mixture continuously is introduced into a first separation zone maintained at a temperature level of about 450 degrees F. and a pressure of about 675 psig. The feed mixture separates into a first light phase comprising oils, resins and solvent and a first heavy phase comprising asphaltenes and solvent.

The first light phase continuously is withdrawn and introduced into a second separation zone. The second separation zone is maintained at a temperature level of about 425 degrees F. and a pressure level of about 650 psig. The first light phase is caused to separate into a second light phase comprising solvent and a second heavy phase comprising oils, resins and some solvent.

The second heavy phase continuously is withdrawn from the second separation zone and passed through a pressure reduction valve to reduce the pressure level of the second heavy phase. The second heavy phase then is introduced into a steam stripper of uniform diameter in a conventional manner at about the midpoint and above a series of trays at a pressure of about 15 psig. The heavy phase enters the stripper radially. Steam is introduced into the steam stripper below the trays at a pressure of 200 psig. The steam strips any remaining solvent from the oils and resins.

The vaporized solvent and steam are withdrawn from the steam stripper and the solvent and steam are condensed. The resultant liquid stream then is introduced into a solvent surge vessel which has a water draw. After 8 hours of continuous operation, the solvent surge vessel is inspected and is found to contain a deposit of fine particle size resins which has collected therein and partially blocked the water drain conduit.

A second test then is run in which a tangential heavy phase entry is installed to deliver the mixture of vaporized solvent, mist and fluid-like asphaltenes tangentially to a channel built around the complete circumference of the steam stripper. The solvent surge vessel is cleaned and the process is operated as in the first test. After 24 hours of continuous operation the interior of the solvent surge vessel is found to contain a small deposit of asphaltenes.

A third test then is run, in accordance with the process of this invention, by installing a steam stripper 58 provided with an inlet horn 30 (as shown in FIGS. 2 and 3) and the solvent surge vessel is cleaned. The conditions are all maintained as in the first test. After 48 hours of continuous process operation the interior of the solvent surge vessel is inspected. The solvent surge vessel is found to contain no new deposit of asphaltenes.

The foregoing Examples clearly illustrate the benefit which is to be derived from practice of the present invention. This invention permits continuous operation of a bituminous separation process by recombining the fog or mist of fine particle size bituminous material formed upon pressure reduction of the separated phase with the fluid-like portion of the separated phase to thereby avoid carry-over of the fine particles into the solvent recovery apparatus of the process.

The term "bituminous material" as used herein means pyrogenous bitumens and native bitumens, one or more fractions or components thereof, products obtained by treating these materials or one or more of their components or fractions with air or another oxygen containing gas in the presence or absence of catalysts and products obtained by otherwise treating these materials. The pyrogenous bitumens include heavy or very low API gravity petroleum crudes, reduced crudes, either steam or vacuum refined, hard and soft wood pitches, coal tar residues, cracked tars, tall oil and the like. The native bitumens include gilsonite, wurtzilite, albertite and native asphalt, for instance, Trinidad asphalt and the like. Suitable catalysts include, for example, phosphorus pentoxide, ferric chloride, cobaltic salts and the like. The term "otherwise treating" as used herein includes, for example, condensation of asphalt-type material in the presence of a suitable treating agent to produce heavier or more complex materials. Examples of suitable treating agents are catalysts of the Friedel-Craft type.

The term "solvent" as used herein means a fluid comprising at least one member selected from the group consisting of: atomatic hydrocarbons having normal boiling points below 350 degrees F., such as benzene, toluene, o-, m- and p-xylene and isopropyl benzene; paraffin hydrocarbons containing from 3 through 9 carbon atoms, such as propane, butane, pentane, hexane, heptane, octane and nonane; and mono-olefin hydrocarbons containing from 4 to 8 carbon atoms, such as butene, pentene, hexane, heptene and octene; and other related organic compounds such as alcohols containing 3 through 9 carbon atoms and the like.

While the present invention has been described with respect to what at present are preferred embodiments thereof, it will be understood, of course, that certain changes, substitutions, modifications and the like may be made therein without departing from its true scope as defined in the appended claims.

What is claimed is:
1. A process comprising:
   separating an admixture comprising a fluid-like bituminous material and a solvent in a separation zone into at least a fluid-like light phase comprising a portion of said bituminous material and solvent and a fluid-like heavy phase comprising the remainder of said bituminous material and solvent by maintaining the mixture at an elevated temperature and pressure;
   reducing the pressure on said heavy phase to vaporize at least a portion of the solvent present therein and form a mixture of fluid-like bituminous material in association with said vaporized solvent together with undesired fine particles of bituminous material dispersed therein;
   introducing said mixture into a steam stripping zone comprising a steam stripper vessel to separate at least a portion of any nonvaporized solvent remaining in association with said fluid-like bituminous material, said mixture being introduced into said stripping zone through an introduction means in a manner such that a centrifugal motion is imparted thereto, said introduction means including a plurality of vanes, the surfaces of which are at least partially wetted by the fluid-like bituminous material of said mixture and which utilize said centrifugal motion to create turbulence in said mixture within said introduction means to cause at least a portion of said fine particle size bituminous material dispersed in said vaporized solvent to impinge on said portion of said surfaces of said vanes on which said fluid-like bituminous material is present and adhere to said fluid-like bituminous material to cause said fine particles of bituminous material to separate from said vaporized solvent; and recovering said solvent from said steam stripping zone substantially free of any fine particle size bituminous material.

2. The process of claim 1 wherein the solvent comprises at least one member selected from the group consisting of aromatic hydrocarbons having normal boiling points below 350 degrees F., paraffin hydrocarbons containing from 3 through 9 carbon atoms, mono-olefin hydrocarbons containing from 4 to 8 carbon atoms, and alcohols containing 3 through 9 carbon atoms.

3. The process of claim 1 wherein the elevated temperature and pressure are defined further as a temperature in the range of from about 150 degrees F. to above the critical temperature of the solvent and a pressure at least equal to the vapor pressure of the solvent when at a temperature below the critical temperature of the solvent and at least equal to the cricital pressure of the solvent when at a temperature equal to or above the critical temperature of the solvent.

4. The process of claim 1 wherein said introduction of said mixture into said steam stripping zone imparts a generally downward motion in addition to the centrifugal motion imparted to said mixture.

5. The process of claim 1 wherein the fluid-like bituminous material comprises a residuum comprising asphaltenes, resins and oils and the portion of fluid-like bituminous material separated as the heavy phase comprises asphaltenes contained in the residuum.

6. The process of claim 1 wherein the fluid-like bituminous material comprises a residuum comprising asphaltenes, resins and oils and the portion of fluid-like bituminous material separated as the heavy phase comprises asphaltenes and resins contained in the residuum.

7. The process of claim 1 wherein said vanes are provided with a corrugated structure.

8. A process comprising:
separating an admixture comprising a fluid-like bituminous material and a solvent in a separation zone into at least a fluid-like light phase comprising a portion of said bituminous material and solvent and a fluid-like heavy phase comprising the remainder of said bituminous material and solvent by maintaining the mixture at an elevated temperature and pressure;

reducing the pressure on said light phase to vaporize at least a portion of the solvent present therein and form a mixture of fluid-like bituminous material in association with said vaporized solvent together with undesired fine particles of bituminous material dispersed therein;

introducing said mixture into a steam stripping zone comprising a steam stripper vessel to separate at least a portion of any nonvaporized solvent remaining in association with said fluid-like bituminous material, said mixture being introduced into said stripping zone through an introduction means in a manner such that a centrifugal motion is imparted thereto, said introduction means including a plurality of vanes, the surfaces of which are at least partially wetted by the fluid-like bituminous material of said mixture and which utilize said centrifugal motion to create turbulence in said mixture within said introduction means to cause at least a portion of said fine particle size bituminous material dispersed in said vaporized solvent to impinge on said portion of said surfaces of said vanes on which said fluid-like bituminous material is present and adhere to said fluid-like bituminous material to cause said fine particles of bituminous material to separate from said vaporized solvent; and recovering solvent from said steam stripping zone substantially free of any fine particle size bituminous material.

9. The process of claim 8 wherein the solvent comprises at least one member selected from the group consisting of aromatic hydrocarbons having normal boiling points below 350 degrees F., paraffin hydrocarbons containing from 3 through 9 carbon atoms, mono-olefin hydrocarbons containing from 4 to 8 carbon atoms, and alcohols containing 3 through 9 carbon atoms.

10. The process of claim 8 wherein the elevated temperature and pressure are defined further as a temperature in the range of from about 150 degrees F. to above the critical temperature of the solvent and a pressure at least equal to the vapor pressure of the solvent when at a temperature below the critical temperature of the solvent and at least equal to the critical pressure of the solvent when at a temperature equal to or above the critical temperature of the solvent.

11. The process of claim 8 wherein the fluid-like bituminous material comprises a residuum comprising asphaltenes, resins and oils and the portion of fluid-like bituminous material separated as the light phase comprises resins and oils.

12. The process of claim 8 wherein the fluid-like bituminous material comprises a residuum comprising asphaltenes, resins and oils and the portion of fluid-like bituminous material separated as the light phase comprises oils.

13. The process of claim 8 wherein said introduction of said mixture into said steam stripping zone imparts a generally downward motion in addition to the centrifugal motion imparted to said mixture.

14. The process of claim 8 wherein said vanes are provided with a corrugated structure.

15. A process comprising:
separating an admixture comprising (i) a residuum comprising asphaltenes, resins and oils and (ii) a solvent in a separation zone into a light phase comprising oils and solvent and a heavy phase comprising asphaltenes, resins and some solvent by maintaining the mixture at an elevated temperature and pressure;

reducing the pressure on said heavy phase to vaporize at least a portion of the solvent present therein and form a mixture of asphaltenes and resins in association with said vaporized solvent together with undesired fine particles of asphaltenes and resins dispersed therein;

introducing said mixture into a steam stripping vessel to separate at least a portion of any nonvaporized solvent remaining in association with the asphaltenes and resins, said mixture being introduced into said stripping vessel through an introduction means in a manner such that a centrifugal motion is imparted thereto, said introduction means including a plurality of vanes, the surfaces of which are at least partially wetted by the asphaltenes and resins present and which utilize said centrifugal motion to create turbulence in said mixture within said introduction means to cause at least a portion of said fine particle size asphaltenes and resins dispersed in said vaporized solvent to impinge on said surfaces of said vanes on which said asphaltenes and resins are present and adhere to said asphaltenes and resins to cause said fine particles of asphaltenes and resins to separate from said vaporized solvent; and recovering said solvent from said steam stripping vessel substantially free of any fine particle size asphaltenes and resins.

16. The process of claim 15 wherein the solvent comprises at least one member selected from the group consisting of aromatic hydrocarbons having normal boiling points below 350 degrees F., paraffin hydrocarbons containing from 3 through 9 carbon atoms, monoolefin hydrocarbons containing from 4 to 8 carbon atoms, and alcohols containing 3 through 9 carbon atoms.

17. The process of claim 15 wherein the elevated temperature and pressure are defined further as a temperature in the range of from about 150 degrees F. to above the critical temperature of the solvent and a pressure at least equal to the vapor pressure of the solvent when at a temperature below the critical temperature of the solvent and at least equal to the critical pressure of the solvent when at a temperature equal to or above the critical temperature of the solvent.

18. The process of claim 15 wherein said vanes are provided with a corrugated structure.

* * * * *